United States Patent [19]

Kobayashi

[11] Patent Number: 4,955,678
[45] Date of Patent: Sep. 11, 1990

[54] ENGAGING STRUCTURE FOR A MOUNTABLE/DISMOUNTABLE ELECTRONIC APPARATUS USED IN A VEHICLE

[75] Inventor: Shigeotshi Kobayashi, Tokyo, Japan

[73] Assignee: Clarion Co., Ltd., Tokyo, Japan

[21] Appl. No.: 375,244

[22] Filed: Jun. 30, 1989

[30] Foreign Application Priority Data

Jul. 4, 1988 [JP] Japan .................................. 63-87968

[51] Int. Cl.$^5$ ............................................. A47B 88/00
[52] U.S. Cl. ................................. 312/320; 312/274; 312/7.1
[58] Field of Search ................ 312/32, 274, 271, 276, 312/333, 711, 319; 224/281, 42, 45 R

[56] References Cited

U.S. PATENT DOCUMENTS

| | | | |
|---|---|---|---|
| 2,514,246 | 7/1950 | Knox | 312/320 |
| 3,039,837 | 6/1962 | Poe | 312/320 |
| 3,246,938 | 4/1966 | Norer et al. | 312/320 X |
| 3,367,732 | 2/1968 | Beye | 312/320 |
| 3,472,569 | 10/1969 | Peel | 312/319 |
| 4,726,632 | 2/1988 | Pori | 312/7.1 |

*Primary Examiner*—Joseph Falk
*Attorney, Agent, or Firm*—Flynn, Thiel, Boutell & Tanis

[57] ABSTRACT

An engaging structure for a mountable/dismountable electronic apparatus used in a vehicle, which can facilitate the raise up of a handle, when the apparatus is dismounted from the vehicle, owing to the fact that when an engagement releasing lever is pushed-in to release the engagement of the main body of the apparatus to the vehicle, the handle put in the neighborhood of the main body of the apparatus is pushed-out at the same time towards a user.

6 Claims, 4 Drawing Sheets

ENGAGING STRUCTURE FOR A MOUNTABLE/DISMOUNTABLE ELECTRONIC APPARATUS USED IN A VEHICLE

FIELD OF THE INVENTION

This invention relates to an electronic apparatus used in a vehicle such as a radio, an audio apparatus, a wireless communication apparatus, etc. and more in detail to an electronic apparatus provided with a rotatable handle on the front thereof so as to be mountable/dismountable to/from the vehicle.

BACKGROUND OF THE INVENTION

Recently, electronic apparatuses used in vehicles such as radios, audio apparatuses, wireless communication apparatuses have been graded up rapidly. Accompanied therewith, an antitheft lock therefor poses a problem to be solved.

For this reason, from a point of view of the antitheft, electronic apparatuses used in vehicles, which are mountable/dismountable to/from the vehicles, called take-away or take-out, have come in wide use.

In the case where the driver leaves his car during parking etc., he can dismount his electronic apparatus from his car to bring it with him or put it in his trunk, etc.

Such an electronic apparatus used in a vehicle can be constructed so as to be mountable/dismountable to/from the vehicle. But, on the other hand, there was a problem that when a shock is given to the vehicle, the electronic apparatus is dismounted from the part, where it is mounted, and springs out towards the seat. For this reason, an electronic apparatus used in a vehicle provided with a locking mechanism, capable of keeping the mounted state, when it is mounted on the vehicle, has been proposed.

As such a locking mechanism, that indicated in FIG. 1 can be cited. That is, there is disposed a lock releasing lever 3, on the extremity of which a lock releasing button 2 is mounted, on one side of the main body 1 of the electronic apparatus used in a vehicle. On the other extremity of this lock releasing lever 3 there is disposed an engaging protrusion 4 protruding towards the apparatus side and further a spring 5 is mounted between the main body 1 of the apparatus and the lock releasing lever 3. They are so constructed that the lock releasing lever 3 is energized towards the driver. Further a guiding hole 6 for guiding the lock releasing lever 3 in the forward and backward movement is formed therein, in which a guide pin 7 mounted on the apparatus side is inserted slidably.

In addition, at the inner part of the lock releasing lever 3 there are disposed a hook plate 8 and a plate spring 9. An engaging hole 10, with which the engaging protrusion 4 formed on the lock releasing lever 3 stated above is engaged, is formed in this hook plate 8, on which locking protrusions 11 protruding towards the vehicle body are also disposed. On each of these locking protrusions 11, as indicated in FIG. 2, there are formed an engaging portion 11a, a tapered portion 11b formed so as to follow the engaging portion, and a tapered portion 11c formed therebehind.

Furthermore, a plate spring 9 disposed on the apparatus side of the hook plate 8 is secured to the main body of the apparatus at the extremity on the rear side thereof.

In addition, on the front of the electronic apparatus 1 used in a vehicle there is disposed rotatably a handle 12 for taking out the apparatus the handle being movable between a retracted position and a carrying or drawn-out position.

Since such an apparatus of so-called take-out system is dismountable, it is easy also to steal it. Therefore, there is a fear that it is chosen as an object of steal, using it as a criterion that it is provided with a handle. Therefore, in order that the presence of the handle cannot be perceived at a glance, such a construction is also adopted that the handle is rotated to a position extremely close to the periphery of the front panel of the main body of the apparatus and brought down there. However, in such a case, there is an inconvenience that when it is tried to raise up the handle in order to dismount the main body of the apparatus from the vehicle, it is difficult to set a finger on the handle so that it can be raised up only hardly.

OBJECT OF THE INVENTION

This invention has been done in order to remove the drawbacks described above of a mountable/dismountable electronic apparatus used in a vehicle and the object thereof is to provide an engaging structure, having a handle hardly perceived, with which the mountable/dismountable electronic apparatus can be easily mounted/dismounted.

SUMMARY OF THE INVENTION

In order to achieve the above object, an engaging structure for a mountable/dismountable electronic apparatus used in a vehicle, which is mounted/dismounted by sliding it with respect to the vehicle, is characterized in that it comprises engaging means disposed on one side of a main body of the apparatus for engaging the main body of the apparatus with the vehicle in a state where it is mounted on the vehicle; an engagement releasing lever disposed slidably forward and backward on the side of a main body of the apparatus for releasing the engagement of the main body of the apparatus by means of the engaging means stated above, when it is pushed towards the rear side; a handle disposed rotatably on the front portion of the apparatus; and a handle pushing out lever disposed on the side of the main body of the apparatus, which is pushed at one extremity by the engagement releasing lever stated above pushed-in towards the rear side to be rotated and at this time the other extremity pushes-out the handle located at the neighborhood of the main body of the apparatus towards the front side.

DETAILED DESCRIPTION

Figure 1:
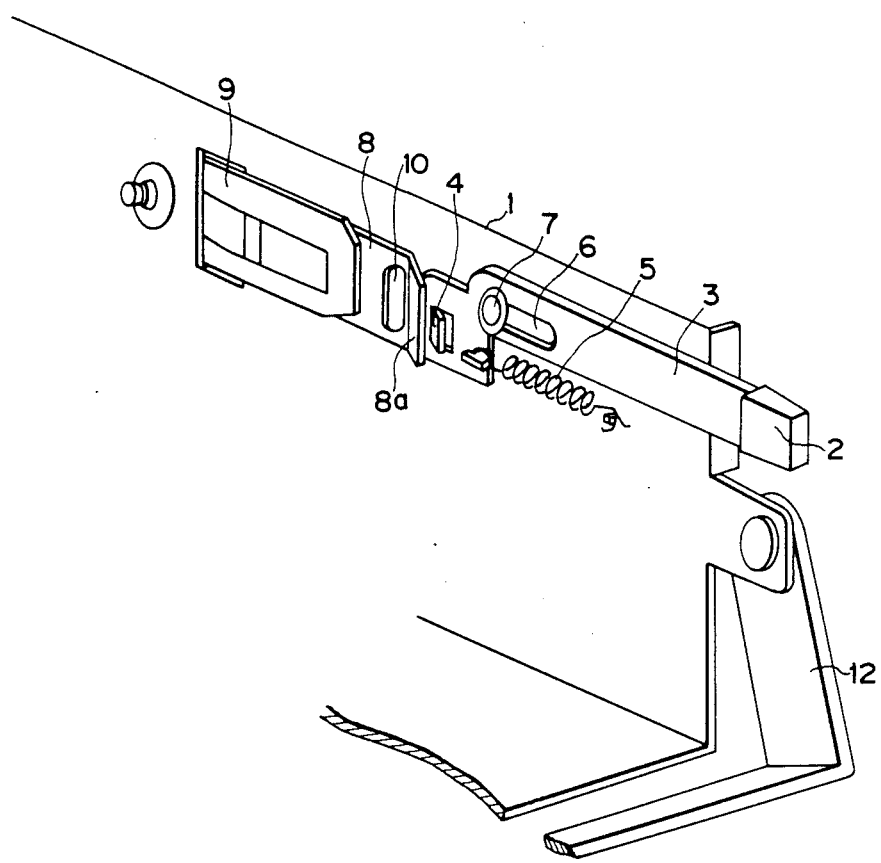
FIG. 1 is a perspective view illustrating a prior art engaging structure.
Figure 2:
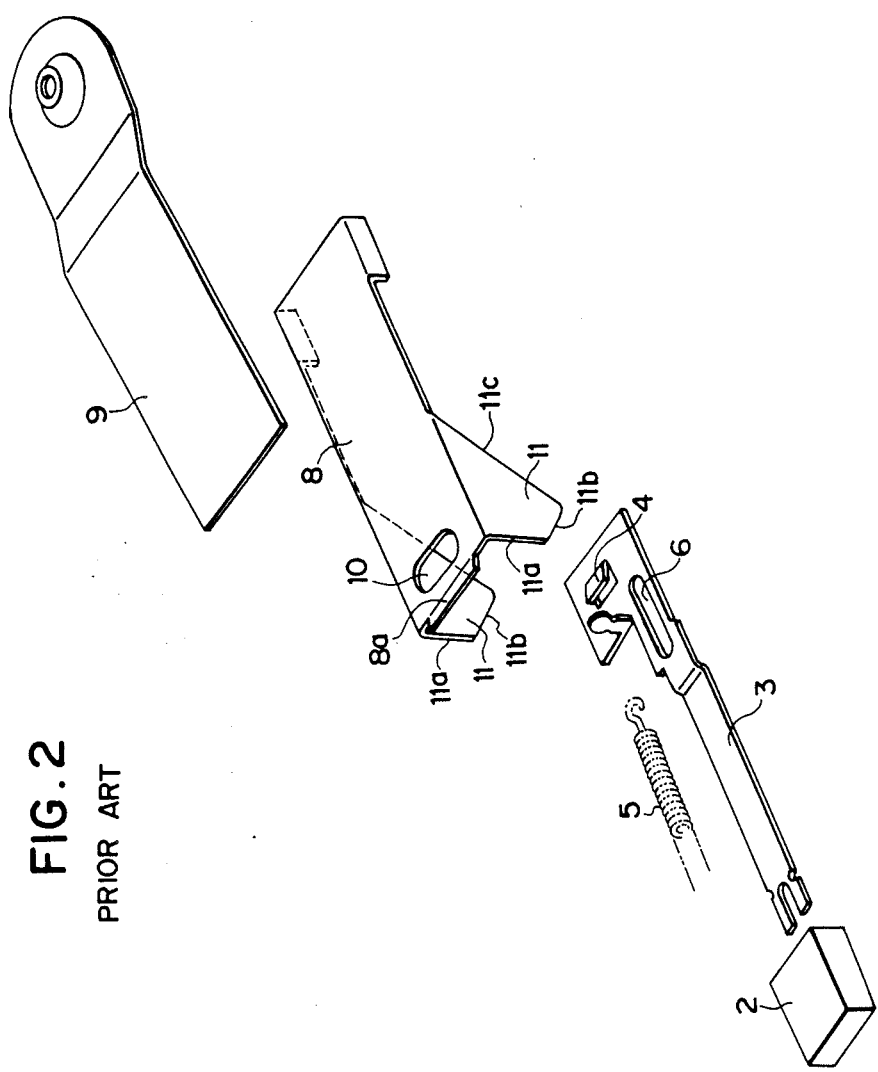
FIG. 2 is an exploded perspective view of the prior art engaging structure.
Figure 3A:
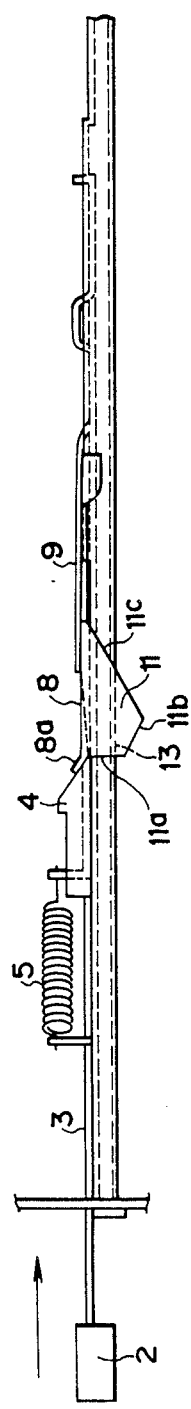
FIGS. 3(A), and 3(B) and 3(C) are schemes for explaining the engagement releasing operation according to an embodiment of this invention.
Figure 3B:
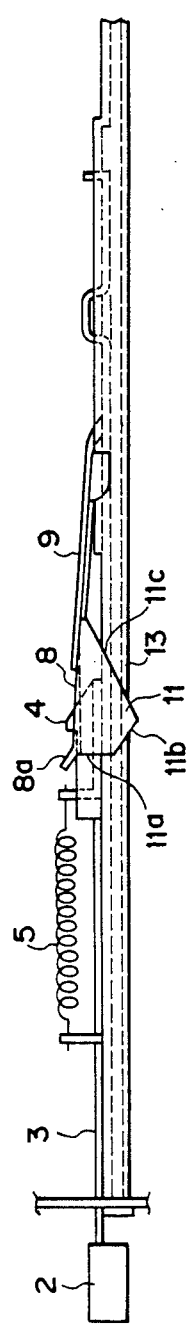
Figure 3C:
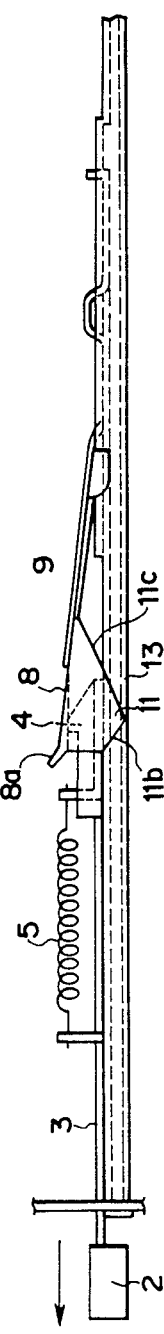

FIGS. 3(A), 3(B) and 3(C) are schemes viewed from the top for explaining the engagement releasing operation of an engaging structure according to this invention. When it is viewed in this direction, the views are completely identical to those of the prior art technique indicated in FIG. 1. However, since they are necessary for explaining this embodiment, they will be described here.

At first, when the main body of the apparatus 1 is dismounted from the vehicle, as indicated in FIG. 3(A), the lock releasing button 2 is pushed-in. Then an engaging protrusion 4 disposed on the rear side of the lock releasing lever 3 thrusts the hook plate 8 and the hook plate 8 is thrusted towards the apparatus. When the engaging protrusion 4 is engaged with the engaging hole 10 formed in the hook plate 8, as indicated in FIG. 3(B), the engaging portion 11a of the locking protrusion 11 formed on the outer side of the hook plate 8 is disengaged from an engaging hole 13 formed in the body of the vehicle. Thus the hook plate 8 is pushed-in towards the apparatus and the tapered portion 11b is engaged with the engaging hole 13 on the vehicle side.

In this state, the handle 12 disposed on the front of the main body of the apparatus 1 is drawn out. Grasping this handle, the user draws out the main body of the apparatus towards him. Then, as indicated in FIG. 3(C), the locking protrusion 11 of the hook plate, which is engaged with the engaging hole 13 on the vehicle side, is pushed further towards the inner side along the tapered portion 11b and thus the apparatus can be dismounted from the vehicle. Further, at this time, the engagement of the engaging protrusion 4 of the lock releasing lever, which is engaged with the engaging hole 10 formed in the hook plate 8, is released and the lock releasing lever 3 is returned to the state before the push by the resilient force of the spring 5.

Figure 4:
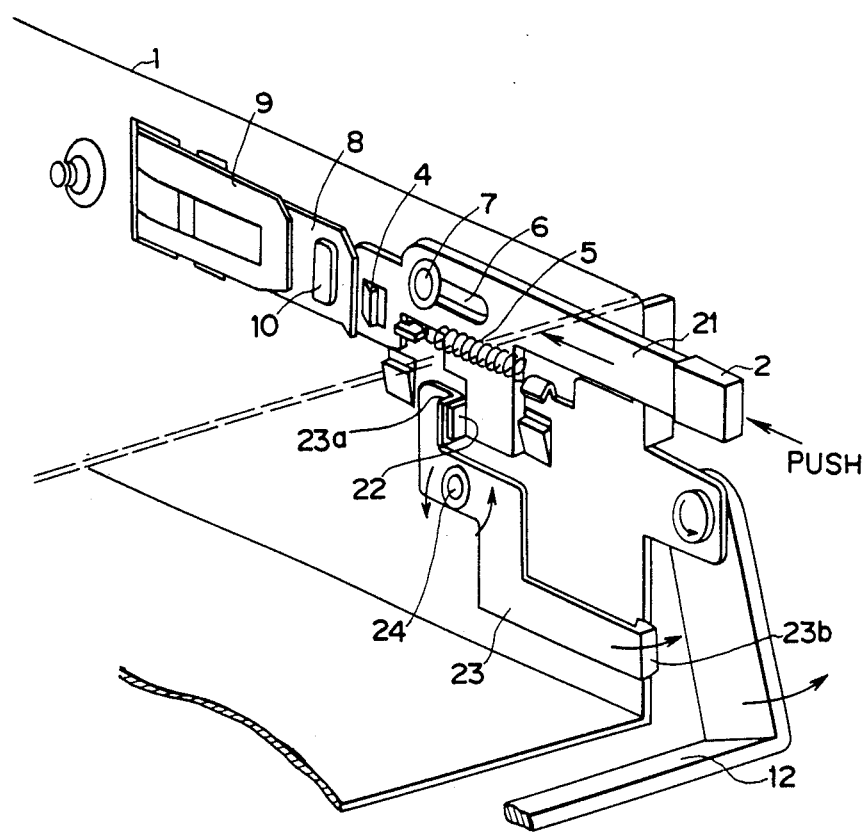
FIG. 4 is a perspective view of an engaging structure according to this invention.
Figure 5:
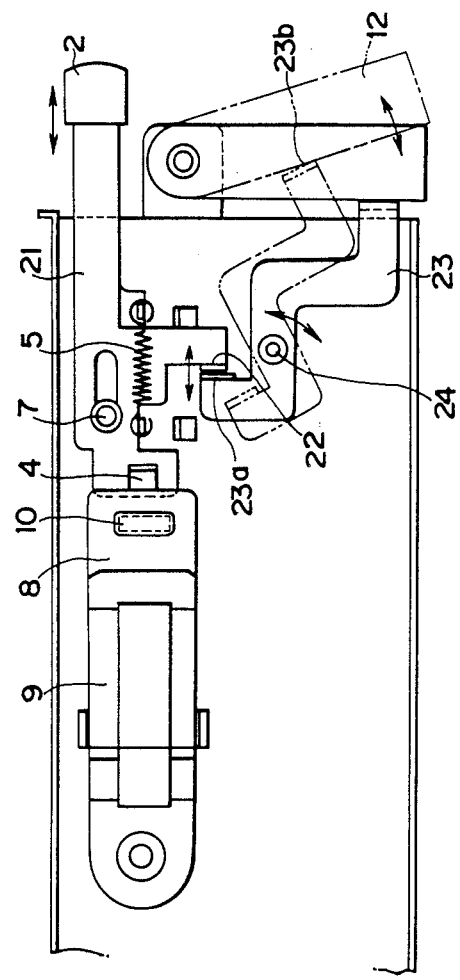
FIG. 5 is a side view of the engaging structure according to this invention.

In this embodiment, as indicated in FIGS. 4 and 5, a thrusting protrusion 22 is formed on the lock releasing lever 21. Further a handle pushing-out lever 23 is disposed under the lock releasing lever 21 and mounted on the main body of the apparatus 1 pivotably around a pivot 24.

Further, on this handle pushing-out lever 23, a pushed portion 23a pushed towards the rear side by the thrusting protrusion 22 is formed at an extremity and a pushing portion 23b pushing the handle 12 so as to rotate towards the user is formed at the other extremity.

The mountable/dismountable electronic apparatus used in a vehicle having such a construction according to this embodiment can be dismounted from the body of the vehicle in a simple manner, as described below.

That is, when the lock releasing lever 21 is pushed-in, the thrusting protrusion 22 is also pushed towards the rear side together therewith and the handle pushing-out lever 23 is pivoted around the pivot 24. Then the handle 12 is pushed towards the user by the thrusting portion 23b formed at the other end and it is in the drawn-out state.

In this way, according to this embodiment, it is possible to execute the lock releasing operation and the handle drawing-out operation in one touch, when the apparatus is to be drawn-out from the body of the vehicle.

What is claimed is:

1. An apparatus comprising: first and second members, said first member being insertable into said second member in a first direction and being removable from said second member in a second direction opposite said first direction; engaging means operable when said first member is in said second member for releasably coupling said first and second members in a manner preventing movement of said first member in said second direction relative to said second member; a carrying handle supported on said first member for movement between retracted and carrying positions; a manually operable releasing part supported on said first member for movement between first and second positions; first means for causing said engaging means to interrupt said releasable coupling of said first and second members in response to movement of said releasing part from its first position to its second position; and second means for moving said carrying handle from its retracted position to its carrying position in response to movement of said releasing part from its first position to its second position.

2. An apparatus as recited in claim 1, wherein said second means includes a pushing out lever which has first and second ends and which is pivotally supported on said first member at a location between said first and second ends for movement between first and second positions, wherein said releasing part has a thrusting portion which, as said releasing part is moved from its first to its second position, engages said first end of said pushing out lever and pivots said pushing out lever from its first position to its second position, and wherein as said pushing out lever is pivoted from its first position to its second position said second end thereof engages said carrying handle and moves said carrying handle from its retracted position to its carrying position.

3. An apparatus as recited in claim 2, wherein said carrying handle is supported on said first member for pivotal movement between said retracted and carrying positions thereof, and wherein said second end of said pushing out lever engages said carrying handle at a location spaced from a pivot axis of said carrying handle.

4. An apparatus as recited in claim 3, wherein said releasing part moves approximately parallel to said first and second directions relative to said first member, and including means for resiliently urging said releasing part in said second direction.

5. An apparatus comprising:
   an electronic unit for a vehicle which is respectively mounted and dismounted by sliding it respectively in backward and forward directions relative to the vehicle;
   engaging means disposed on one side of a main body of said unit for releasably coupling said main body of said unit with the vehicle in a state where said unit is mounted on said vehicle;
   an engagement releasing lever slidably supported for movement in said forward and backward directions on said side of said main body of said unit, said engaging means releasing said releasable coupling of said main body of said unit with the vehicle when said engagement releasing lever is pushed in said backward direction;
   a carrying handle supported rotatably on a front portion of said unit; and
   a handle pushing out lever supported rotatably on said side of said main body of said unit, said lever being pushed at one end by and rotated by said engagement releasing lever when said engagement releasing lever is pushed in said backward direction and having a further end which engages and pushes out said handle as said pushing out lever is rotated by said engagement releasing lever.

6. An apparatus according to claim 5, further including a spring which is coupled to and yieldably urges said engagement releasing lever in said forward direction.

* * * * *

UNITED STATES PATENT AND TRADEMARK OFFICE
CERTIFICATE OF CORRECTION

PATENT NO. : 4 955 678
DATED : September 11, 1990
INVENTOR(S) : Shigetoshi KOBAYASHI It is certified that error appears in the above-identified patent and that said Letters Patent is hereby corrected as shown below:

On the title page, item [75] Inventor: change

"Shigeotshi" to ---Shigetoshi---.

Signed and Sealed this

Seventeenth Day of November, 1992

Attest:

DOUGLAS B. COMER

Attesting Officer     Acting Commissioner of Patents and Trademarks